US012773807B1

(12) United States Patent
Crutchfield et al.

(10) Patent No.: US 12,773,807 B1
(45) Date of Patent: Oct. 27, 2026

(54) ADDITIVE APPLICATION OF MACHINABLE STOCK LAYER ONTO CMC COMPONENTS

(71) Applicant: Rolls-Royce High Temperature Composites, Inc., Cypress, CA (US)

(72) Inventors: Jeffrey Crutchfield, Cypress, CA (US); Pathikumar Sellappan, Cypress, CA (US); Christopher Mara, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 25 days.

(21) Appl. No.: 18/432,735

(22) Filed: Feb. 5, 2024

Related U.S. Application Data

(60) Provisional application No. 63/486,177, filed on Feb. 21, 2023.

(51) Int. Cl.
*B28B 3/02* (2006.01)
*B28B 7/36* (2006.01)
*B28B 23/02* (2006.01)
*B30B 15/06* (2006.01)
*C04B 35/80* (2006.01)

(52) U.S. Cl.
CPC .............. *B28B 3/024* (2013.01); *B28B 7/364* (2013.01); *B28B 23/02* (2013.01); *B30B 15/061* (2013.01); *C04B 35/80* (2013.01)

(58) Field of Classification Search
CPC ........... B28B 3/024; B28B 3/02; B28B 3/003; B28B 7/364; B28B 7/0091; B28B 7/366; B28B 23/02; B30B 15/065; B30B 15/067; B30B 15/061
See application file for complete search history.

(56) References Cited

U.S. PATENT DOCUMENTS 5,573,622 A * 11/1996 Hass ........................ B28B 3/024 156/289
7,686,990 B2 3/2010 Gray
(Continued)

OTHER PUBLICATIONS

Meshalkin et al., "Methods Used for the Compaction and Molding of Ceramic Matrix Composites Reinforced with Carbon Nanotubes", Processes, vol. 8, No. 8, Aug. 18, 2020, 37 pp.
(Continued)

*Primary Examiner* — JaMel M Nelson
(74) *Attorney, Agent, or Firm* — Shumaker & Sieffert, P.A.

(57) ABSTRACT

The disclosure describes a method for additively applying a machinable stock layer to surfaces of a ceramic matric composite (CMC) component. The method includes positioning, on a base fixture, a substrate comprising a component and a machinable stock layer on one or more surfaces of the component. The method further includes positioning one or more backing plates movably coupled to the base fixture, wherein each of the backing plates is configured to receive an applied compressive load and move relative to the base fixture. The method further includes positioning a plurality of rubber sheets, wherein each rubber sheet is coupled to one of the base fixture or a backing plate, and wherein the plurality of rubber sheets is configured to translate the applied compressive load on the one or more backing plates into a distributed compressive load on a surface of the machinable stock layer.

11 Claims, 7 Drawing Sheets

(56) References Cited

U.S. PATENT DOCUMENTS

| | | | | |
|---|---|---|---|---|
| 11,186,525 | B2 | 11/2021 | Shim et al. | |
| 2021/0032172 | A1* | 2/2021 | Shim | C04B 41/89 |
| 2021/0395156 | A1 | 12/2021 | Crutchfield | |
| 2022/0363605 | A1* | 11/2022 | Crutchfield | B28B 7/32 |
| 2025/0215811 | A1* | 7/2025 | Direnzi | F01D 25/24 |

OTHER PUBLICATIONS

Tontisakis et al., "Evaluation of surface finish technology in the manufacture of Oxide-Oxide ceramic matrix composites", Ceramics International, vol. 47, No. 4, Feb. 15, 2021, pp. 5347-5363.

* cited by examiner

ADDITIVE APPLICATION OF MACHINABLE STOCK LAYER ONTO CMC COMPONENTS

This application claims the benefit of U.S. Patent Application No. 63/486,177, filed Feb. 21, 2023, the entire contents of which is incorporated herein by reference.

TECHNICAL FIELD

The disclosure relates to additive manufacturing techniques, in particular, to the additive application of a machinable stock material layer on surfaces of ceramic matric composite (CMC) components.

BACKGROUND

A ceramic matrix composite (CMC) includes ceramic fibers embedded in a ceramic matrix. Some components formed from CMCs may have complex geometries that make additive application of certain layers or coatings difficult. Additional layers or coatings may provide protection to CMC components by helping reduce exposure of the CMC component to elements present in a surrounding operating environment. Thus, ensuring proper additive application of additional layers or coatings onto CMC components is advantageous in maintaining the longevity and functionality of the CMC components.

SUMMARY

The disclosure describes example techniques, methods, materials, and systems for the additive application of a machinable stock material layer on surfaces of a ceramic matric composite (CMC) component using multi-piece tooling. In some examples, the disclosure describes a technique that includes positioning, on a base fixture, a substrate comprising a component and a machinable stock layer on one or more surfaces of the component. The machinable stock layer comprises one or more plies of a machinable stock material. The technique further includes positioning one or more backing plates movably coupled to the base fixture. Each of the backing plates is configured to receive an applied compressive load and move relative to the base fixture. The technique further includes positioning a plurality of rubber sheets. Each rubber sheet is coupled to one of the base fixture or a backing plate, and the plurality of rubber sheets is configured to translate the applied compressive load on the one or more backing plates into a distributed compressive load on a surface of the machinable stock layer.

The details of one or more examples are set forth in the accompanying drawings and the description below. Other features, objects, and advantages of the disclosure will be apparent from the description and drawings, and from the claims.

DETAILED DESCRIPTION

Figure 1:
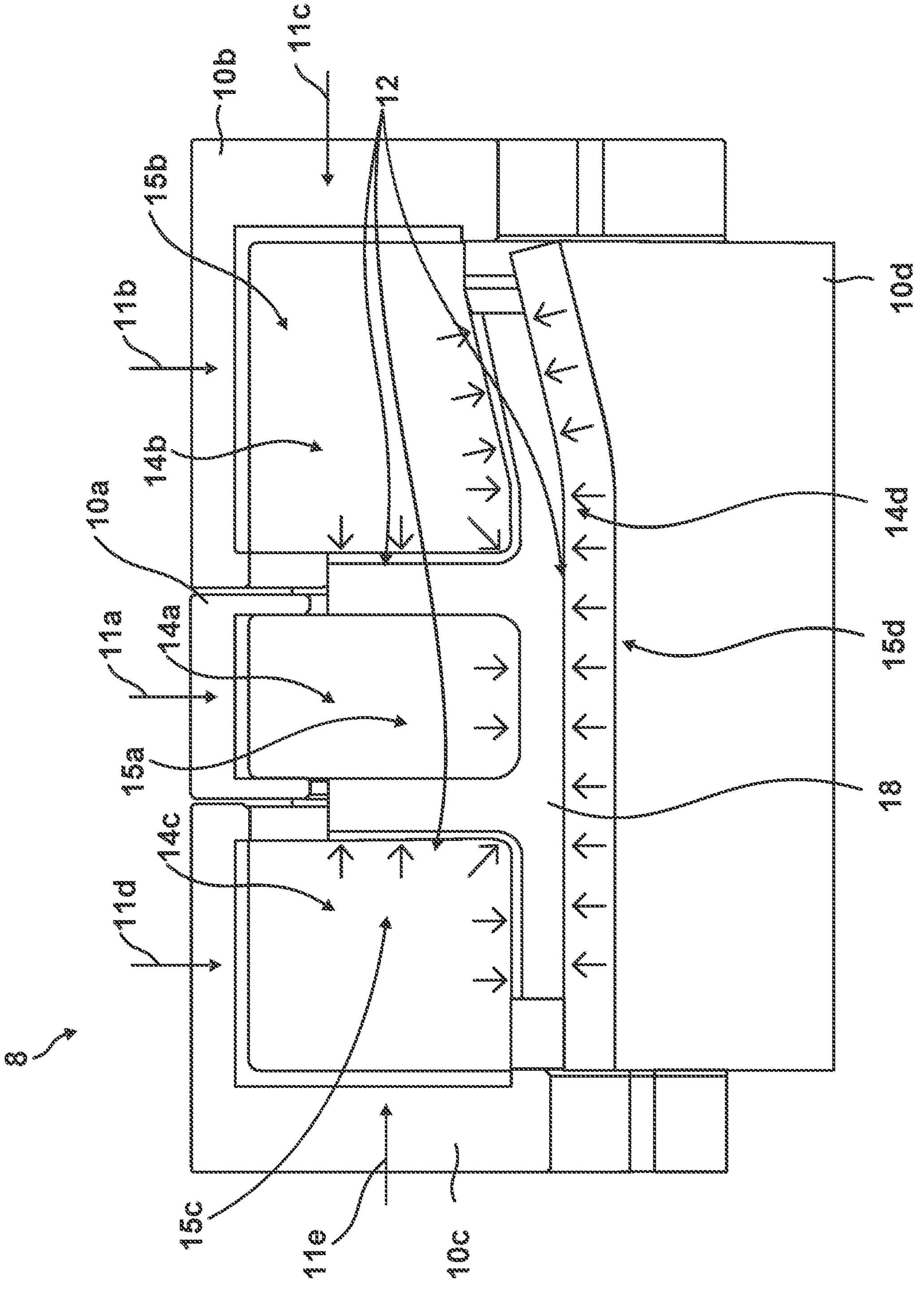
FIG. 1 is a conceptual block diagram illustrating an example system of additively applying machinable stock material onto a CMC component using multi-piece tooling.

The disclosure generally describes techniques for additively applying machinable stock material defining a machinable stock layer onto one or more surfaces of a CMC component using multi-piece tooling. The machinable stock layer may be a tape cast coating that, once applied to a surface of the CMC component, includes a plurality of layers normal to the surface of the CMC component. The machinable stock layer may include one or more of a plurality of materials and be used to form a protective coating on the CMC component or improve the surface functionalities and performance of the CMC component or selected portions of the CMC component.

The machinable stock layer may include a plurality of machinable stock material plies or layers added to the surface of the CMC component via ply layup. To form the machinable stock layer, the laid-up plies or layers may be shaped and cured using compression molding. In compression molding, the machinable stock material of the laid-up plies or layers may be distributed throughout a mold by a compressive load and heated above a curing temperature for a period of time to consolidate ceramic particles, bind the machinable stock layer to the CMC component, and form a green body preform.

The CMC component described herein may consist of various sizes and surface topographies and may be used in a variety of applications. For a CMC component having a relatively complex geometry, application of a uniform compressive load to various surface orientations of the CMC component may be difficult, as the surfaces may be oriented along multiple planes, include curvature, or change during application of the compressive load.

Systems and techniques described herein include a multi-piece tooling configured to apply a consistent, substantially uniform compression load to the plies or layers to improve adhesion of the machinable stock layer to the CMC component and/or improve consolidation of the stacked plies and resin within the machinable stock layer. The multi-piece tooling used in the techniques described herein may be custom-cast silicon rubber sheets adhered or otherwise coupled to aluminum backing plates. Prior to additively applying the machinable stock layer onto the CMC component, the custom-cast silicone rubber sheets may be molded to the CMC component, such that the shape of the silicone rubber sheets, when under the compressive load, may mimic a shape of the CMC component. The multi-piece tooling includes a base fixture and a plurality of moveable backing plates. While the examples described herein include a base fixture and three backing plates comprising custom-cast silicon rubber sheets, the number of base fixtures and backing plates comprising custom-cast silicon rubber sheets is not limited to those examples. For example, a CMC component may require a base fixture and two backing plates comprising custom-cast silicon rubber sheets to form the machinable stock layer onto the CMC component. In another example, a CMC component may require a base fixture and four backing plates comprising custom-cast silicon rubber sheets to form the machinable stock layer onto the CMC component. The number of backing plates may depend on the component design or the shape of the component in which the machinable stock layer is applied.

In some examples, the surfaces of the component in which the machinable stock material is applied may be determined prior to applying the machinable stock layer. Upon determining the surfaces of the component in which the machinable stock material is applied, the number of backing plates needed to access those surfaces may then be determined. The configuration or position of the backing plates needed to achieve the desired application of the machinable stock layer may also be determined. The clamping force needed to achieve the desired application of the machinable stock layer may also be determined. The amount of compression of the rubber sheets needed to impart a desired load may also be determined. Based on the required amount of compression, the dimensions of the surfaces of the component in which the machinable stock layer is applied, and the direction of the applied load, the initial shape of each of the rubber sheets may be determined. Finally, the end configuration of the multi-piece tooling needed to achieve the desired application of the machinable stock layer onto the component may be determined.

To apply a compressive load to the laid-up plies or layers, each of the plurality of backing plates is moved relative to the base fixture to a predetermined position to compress the silicone rubber sheets against the laid-up plies or layers. The multi-piece tooling is configured to impart a controlled interference in the silicone rubber sheets once the backing plates are tightened to the predetermined position. For example, a first portion of a CMC component may be positioned onto a first custom-cast silicon rubber sheet coupled to an aluminum base fixture. One or more plies of machinable stock material may then be added to one or more surfaces of the CMC component via ply layup to form a machinable stock layer on the one or more surfaces of the CMC component. In some examples, the machinable stock layer comprises a uniform thickness. A plurality of backing plates may be positioned onto various portions of the CMC component and fastened to the base fixture using fasteners.

Each silicone rubber sheet may be configured to impart a particular interference on a portion of the CMC component. The interference may be a predetermined amount of compression in response to an applied compressive load to the plurality of backing plates, and may be characterized by a distance of compression of the silicone rubber sheet and a localized compressive load resulting from the applied compressive load. For example, the custom-cast silicon rubber sheets of the base fixture and backing plates may compress to the corresponding uniform interference, resulting in a uniform compression of the machinable stock layer throughout the surface of the component. The uniform compression of the machinable stock layer may also result in no gaps between the machinable stock layer and the CMC component. An assembly comprising the CMC component positioned onto the base fixture and the fastened backing plates may be placed into a vacuum oven set at a predetermined temperature for a predetermined amount of time. Upon removal of the assembly from the vacuum oven, the assembly may then be cooled prior to removing the backing plates. The resulting article may include a dense machinable stock layer having a uniform shape that may resist delamination from the underlying CMC component.

FIG. 1 is a conceptual diagram illustrating an example system 8 comprising a CMC component 18 and machinable stock layer 12 on one or more surfaces of CMC component 18. In some examples, CMC component 18 may be a component of a system that operates at high temperatures, such as a portion of a gas turbine engine. For example, CMC component 18 may be an airfoil, a high-pressure seal segment, a combustion chamber liner, a blade, or the like, of a gas turbine engine.

CMC component 18 includes ceramic fibers embedded within a ceramic matrix. In some examples, CMC component 18 comprises ceramic materials that may include, for example, alumina ($Al_2O_3$); an aluminosilicate; a silicon-containing ceramic, e.g., silica ($SiO_2$) and/or silicon carbide (SiC); silicon nitride ($Si_3N_4$); a silicide (e.g., $MoSi_2$, $NbSi_2$, $TiSi_2$); a transition metal carbide (e.g., WC, $Mo_2C$, or TiC); combinations thereof; or the like. CMC component 18 may also include a matrix material and a reinforcement material consisting of any of the ceramics described herein. In some examples, the reinforcement material may include a continuous monofilament or multifilament fabric. In other examples, the reinforcement material may include discontinuous fibers. In some examples, both the matrix material and the reinforcement material of CMC component 18 may include silicon carbide. After fabrication, CMC component 18 may undergo a machining step that produces a desired surface, which may be complex and varied at different portions of the component.

In some examples, CMC component 18 may include one or more surfaces having a relatively complex geometry. A relatively complex geometry may include two or more surfaces having different planes, surfaces having curvature, surfaces that include projections or depressions, or any other surface in which a unidirectional force may not apply a substantially normal force to the various surfaces of CMC component 18. Automated stock material lay-up can be relatively easily applied to components comprising simple and noncomplex surfaces. For example, a nonconformal, unidirectional compressive load may be adequate for compressing a component having a single planar surface. Components with more complex surfaces, however, may require a less automated and more precise lay-up process to prevent any unwanted overlaps or gaps being formed between the component and the machinable stock layer, which could negatively impact the performance of the component. For example, the unidirectional, nonconformal compressive load described above may apply differing amounts of local compressive load on different complex surfaces depending on an orientation of the surface.

To apply a uniform compressive load to machinable stock layer 12, system 8 includes rubber sheets that are applied to surfaces of machinable stock layer 12 using movable backing plates. Custom-cast silicon rubber sheets may serve as advantageous tools for applying machinable stock layer material to CMC component 18, as the custom sheets are designed to uniformly press onto the surface of the component from which they are formed, thus preventing any gaps between machinable stock layer 12 and CMC component 18 from being created.

System 8 includes a base fixture 10*d* and one or more backing plates 10*a*, 10*b*, 10*c*. Base fixture 10*d* may be configured to position CMC component 18 and machinable stock layer 12 and remain fixed during application of an applied compressive load. Each backing plate 10*a*, 10*b*, 10*c* may be moveably coupled to base fixture 10*d*. System 8 is configured to apply a compressive load to CMC component 18 and machinable stock layer 12 by adjusting a position of backing plates 10*a*, 10*b*, 10*c* relative to base fixture 10*d*. As illustrated in the example of FIG. 1, backing plate 10*a* is configured to apply a first compressive load 11*a* along a y-axis, backing plate 10*b* is configured to apply a second compressive load 11*b* along the y-axis and a third compressive load 11*c* along an x-axis, and backing plate 10*c* is configured to apply a fourth compressive load 11*d* along the y-axis and a fifth compressive load 11*e* along the x-axis. Backing plates 10*a*, 10*b*, 10*c* and base fixture 10*d* may each be relatively rigid and capable of withstanding thermal operating conditions experienced during curing of machinable stock layer 12. Backing plates 10*a*, 10*b*, 10*c*, and base fixture 10*d* may be structural components of various shapes and sizes that can receive applied compressive loads. A variety of materials may be used for backing plates 10*a*, 10*b*, 10*c* and base fixture 10*d* including, but not limited to, metals such as aluminum; ceramics; rigid polymers; and the like. For example, backing plates 10*a*, 10*b*, 10*c* and base fixture 10*d* may be formed from aluminum, which may be relatively inexpensive, easy to form into a desired shape, and have sufficient strength and thermal stability to apply a compressive load during thermal curing. In other examples, backing plates 10*a*, 10*b*, 10*c* and base fixture 10*d* may be formed from any other metallic material that can withstand the operating temperature and applied pressure.

As shown in FIG. 1, system 8 is configured to additively apply machinable stock layer 12 onto CMC component 18 using a distributed compressive load that is applied via rubber sheets 14*a*, 14*b*, 14*c*, and 14*d*. Rubber sheets 14*a*, 14*b*, 14*c*, and 14*d* are coupled to backing plates 10*a*, 10*b*, 10*c*, and base fixture 10*d*, respectively. Rubber sheets 14*a*, 14*b*, 14*c*, 14*d* may be configured to apply a distributed compressive load to machinable stock layer 12 in response to an applied compressive load on backing plates 10*a*, 10*b*, 10*c*. For example, while compressive loads 11*a*, 11*b*, 11*c*, 11*d*, 11*e* (collectively, "compressive loads 11") may be applied substantially unidirectionally, rubber sheets 14*a*, 14*b*, 14*c*, 14*d* may be configured to translate the applied compressive loads 11 into distributed compressive loads that are substantially uniform and normal to surfaces of machinable stock layer 12. As illustrated in the example of FIG. 1, rubber sheet 14*a* is configured to apply a first distributed compressive load 15*a* along a y-axis, rubber sheet 14*b* is configured to apply a second distributed compressive load 15*b* that is normal to surfaces of a first portion of machinable stock layer 12, rubber sheet 14*c* is configured to apply a third distributed compressive load 15*c* that is normal to surfaces of a second portion of machinable stock layer 12, and rubber sheet 14*d* is configured to apply a fourth distributed compressive load 15*d* that is normal to surfaces of a third portion of machinable stock layer 12.

System 8 is designed to impart a controlled interference in rubber sheets 14*a*, 14*b*, 14*c*, and 14*d* when backing plates 10*a*, 10*b*, and 10*c* are tightened against base fixture 10*d* via fasteners. The interference may represent displacement of rubber sheets 14*a*, 14*b*, 14*c*, 14*d* from an initial set of dimensions in response to a predetermined compressive load. To apply a distributed compressive load that is substantially uniform and normal to surfaces of machinable stock layer 12, rubber sheets 14*a*, 14*b*, 14*c*, 14*d* may be configured to conform to a surface of machinable stock layer 12 and deform according to the predetermined, controlled interference. For example, rubber sheets 14*a*, 14*b*, 14*c*, 14*d* may be formed from a flexible material configured to displace in response to an applied compressive force and exert a distributed compressive load 15*a*, 15*b*, 15*c*, 15*d*, respectively. The distributed compressive load may be related to the amount of displacement of rubber sheets 14*a*, 14*b*, 14*c*, 14*d*, such that a particular amount of displacement for a material having a particular elasticity may exert a particular distributed compressive load. Due to an ability of rubber sheets 14*a*, 14*b*, 14*c*, 14*d* to conform to a surface, a directionality of the distributed compressive loads 15*a*, 15*b*, 15*c*, 15*d* exerted by rubber sheets 14*a*, 14*b*, 14*c*, 14*d* may be different from the applied compressive loads 11*a*, 11*b*, 11*c*, 11*d*, 11*e*. For example, in response to receiving applied compressive loads 11*a* and 11*b*, rubber sheet 14*b* may be configured to exert a set of distributed compressive loads 15*c* that are substantially normal to surfaces of machinable stock layer 12, rather than only parallel to applied compressive loads 11*a* and 11*b*.

A variety of material may be used for rubber sheets 14*a*, 14*b*, 14*c*, and 14*d* including, but not limited to, elastomers, such as silicone rubber, thermoplastics, thermosets, and any other elastic material. The material of rubber sheets 14*a*, 14*b*, 14*c*, 14*d* may be selected for a variety of properties including, but not limited to, hardness (e.g., durometer), elasticity, (e.g., Young's modulus), thermal stability (e.g., thermal degradation temperature above curing temperatures of machinable stock layer 12), and the like. Release film and breather cloth may be incorporated between rubber sheets 14*a*, 14*b*, 14*c*, and 14*d* and machinable stock layer 12 during the application process.

Systems described herein may be configured for applying machinable stock layer 12 to CMC component 18 having a particular shape and surfaces to-be-coated. For example, system 8 of FIG. 1 includes three backing plates 10*a*, 10*b*, 10*c* and fourth rubber sheets 14*a*, 14*b*, 14*c*, 14*d* configured to apply a distributed compressive load that is based on the shape of CMC component 18. For other CMC components, a number, shape, orientation, and direction of applied compressive force of backing plates 10 and rubber sheets 14 may be different.

Figure 2:
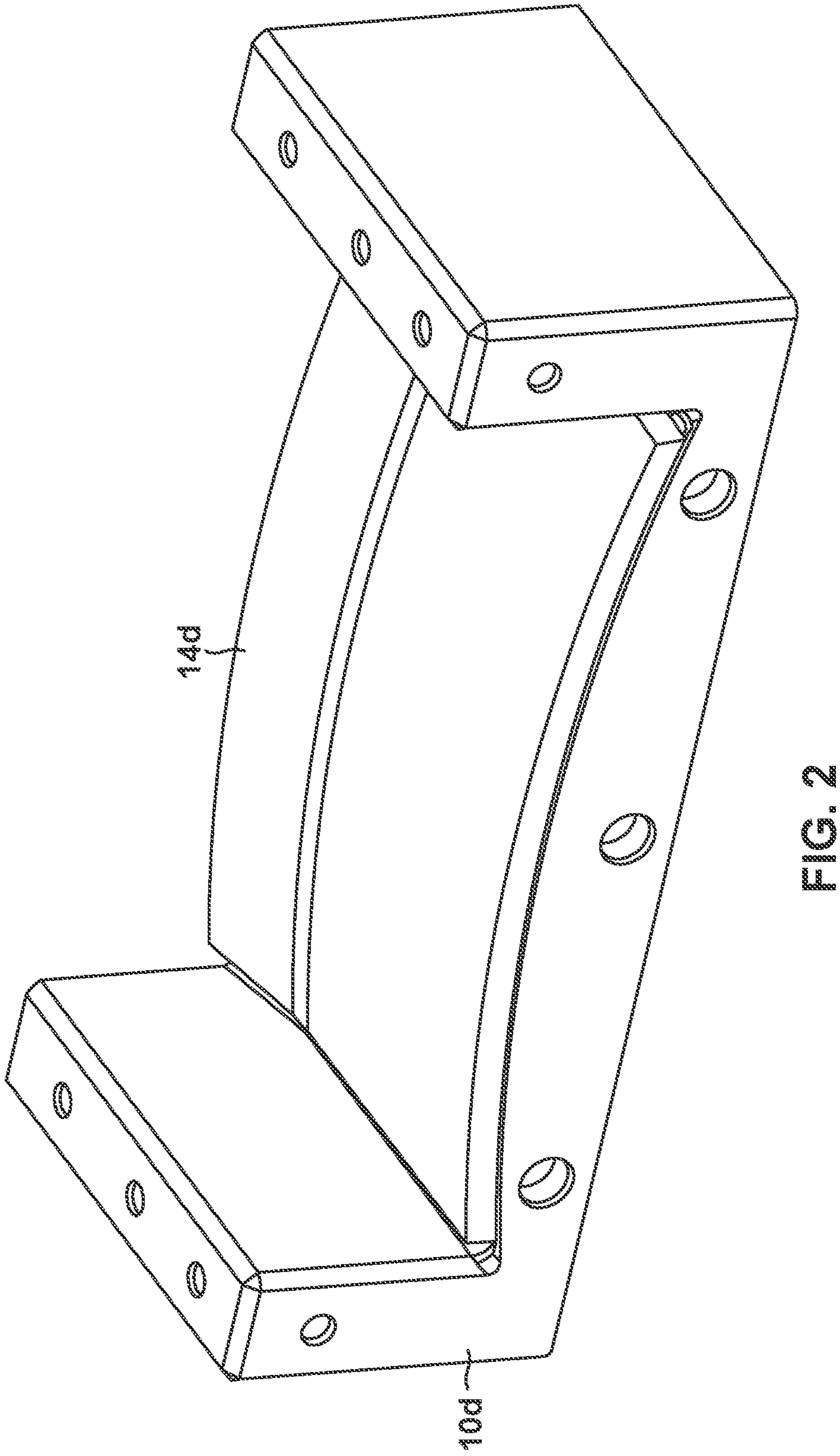
FIG. 2 is a conceptual diagram illustrating an example rubber sheet coupled to a base fixture.

FIG. 2 is a conceptual diagram illustrating an example rubber sheet 14*d* coupled to base fixture 10*d*. Base fixture 10*d* may consist of various dimensions to support the positioning of a component onto rubber sheet 14*d*. As described herein, rubber sheet 14*d* may comprise of silicone rubber or any other type of elastomer and base fixture 10*d* may comprise of materials including, but not limited to, metals such as aluminum. In some examples, rubber sheet 14*d* may comprise of other materials suitable for additively applying a machinable stock layer onto a CMC component, such that the materials included in the sheet do not react with materials included in the CMC component or the machinable stock layer and do not cause any substantial shape change in the CMC component or machinable stock layer during application of any pressure or heat. As described herein, rubber sheet 14*d* is configured to apply a distributed compressive load that is normal to surfaces of a component positioned on rubber sheet 14*d*.

Figure 3:
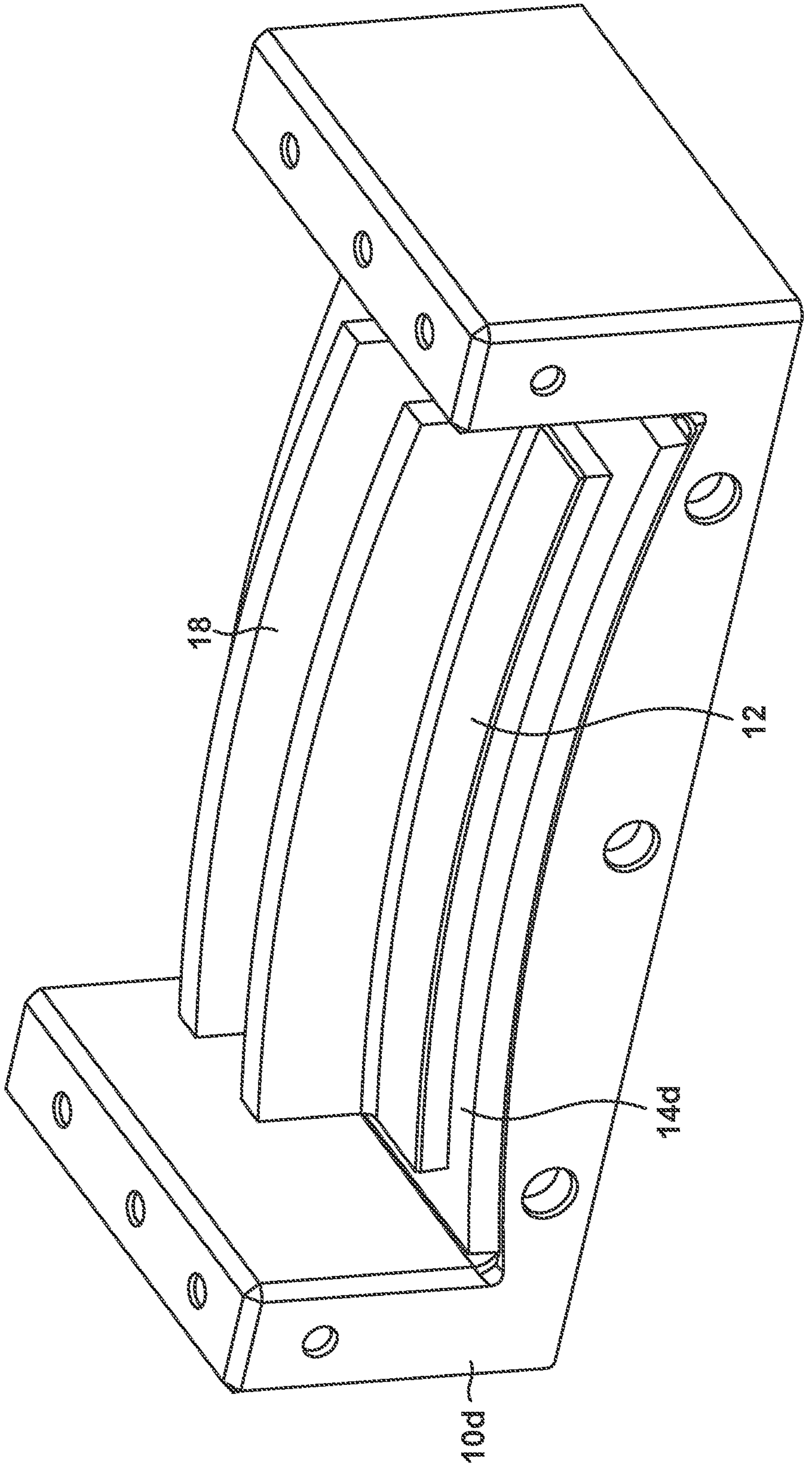
FIG. 3 is a conceptual diagram illustrating an example CMC component with an added machinable stock layer positioned on a first rubber sheet coupled to a base fixture.

FIG. 3 is a conceptual diagram illustrating an example substrate comprising CMC component 18 and machinable stock layer 12 on one or more surfaces of CMC component 18. In the example of FIG. 3, CMC component 18 is positioned on rubber sheet 14*d* that is coupled to base fixture

10*d*. The multi-piece tooling described herein may include rubber sheet 14*d* coupled to base fixture 10*d* as well as any number of additional pieces, e.g., additional rubber sheets coupled to additional backing plates, that may have a feature, shape, or mold determined by the surface of CMC component 18 or the desired surface of machinable stock layer 12 on CMC component 18. As described in the example of FIG. 1, rubber sheet 14*d* is configured to apply a distributed compressive load 15*d* (not shown in FIG. 3) that is normal to surfaces of a portion of machinable stock layer 12 in response to applied compressive loads on one or more backing plates. More specifically, rubber sheet 14*d* may be configured to translate applied compressive loads on one or more backing plates into distributed compressive loads that are substantially uniform and normal to surfaces of machinable stock layer 12.

Upon tightening one or more backing plates to base fixture 10*d* via fasteners, a controlled interference is imparted in rubber sheet 14*d* until the aluminum flange of the one or more backing plates makes hard contact with base fixture 10*d*.

Machinable stock layer 12 is defined by one or more plies of machinable stock material added to one or more surfaces of CMC component 18. In some examples, plies of machinable stock material may be added to CMC component 18 via a ply lay-up process. Although not shown the example of FIG. 3, plies of machinable stock material may be added to one or more surfaces of CMC component 18 after CMC component 18 is placed onto rubber sheet 14*d*. In some examples, plies of machinable stock material may be added to one or more surfaces of CMC component 18 prior to placing CMC component 18 onto rubber sheet 14*d*.

Machinable stock layer 12 may comprise laminate materials. In some examples, machinable stock layer 12 may comprise an organic binder and ceramic material. The organic binder may include, for example, polyvinyl butyral, polyethylene glycol, a latex co-polymer, and/or an acrylate co-polymer. The ceramic material may include, for example, silicon carbide, silicon nitride, silicon nitrocarbide, and/or any other ceramic. In some examples, machinable stock layer 12 may include 40-55 vol. % or less unreacted silicon or carbon. The diameter of the ceramic material particles may range from about 0.5 micron to about 20 microns. Machinable stock layer 12 may also include, in some examples, a surfactant, dispersant, or plasticizer.

Machinable stock layer 12 may have a predetermined surface topography and/or thickness to produce a desired final surface topography and/or thickness for CMC component 18 with added machinable stock layer 12. Plies of machinable stock layer 12 may be prepared by first tape casting a slurry containing the ceramic material, organic binder, and/or other materials onto a polymeric sheet. After the slurry has dried, the plies of machinable stock layer 12 may be removed from the polymeric sheet. In some examples, machinable stock layer 12 may comprise of plies with a solids loading of about 45-60 vol. %. Machinable stock layer 12 may comprise of plies with a thickness ranging from 50 micrometers to 250 micrometers. Prior to adding plies of machinable stock layer 12 onto the surface of CMC component 18, a binder may be deposited (e.g., via spraying) onto the surface of CMC component 18 for improved attachment of the plies. The binder may comprise the same binder used in the slurry or in the tape casted material. Plies of machinable stock layer 12 may be applied under ambient conditions, such as at atmospheric pressure, in air, and/or at room temperature (20-25° C.). At least one ply of machinable stock material is applied to one surface of CMC component 18. In some examples, multiple plies of machinable stock material may be applied to one or more surfaces of CMC component 18 to ensure necessary coverage and/or achieve a desired thickness for machinable stock layer 12.

Figure 4:
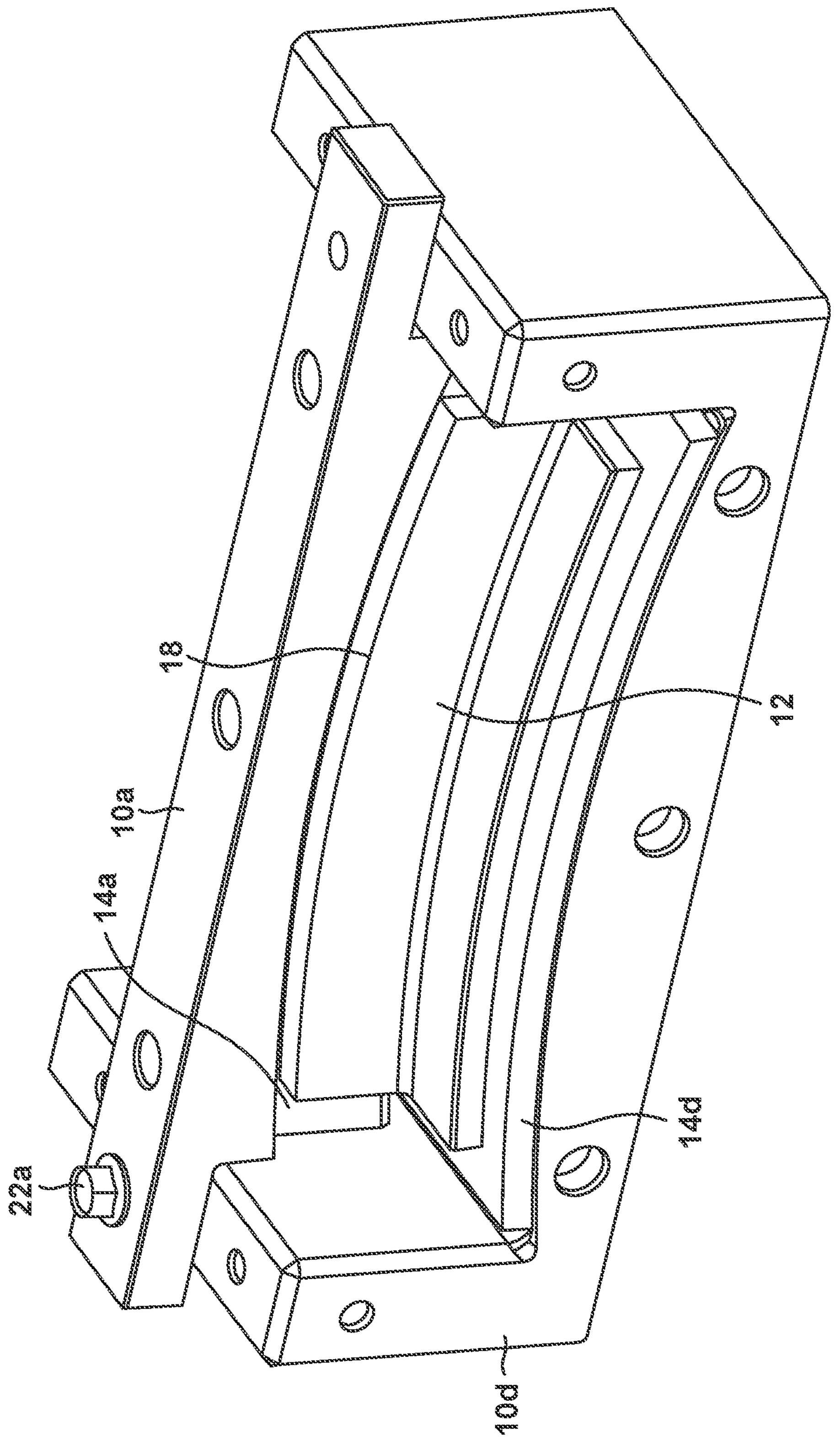
FIG. 4 is a conceptual diagram illustrating an example CMC component with an added machinable stock layer positioned between a first rubber sheet coupled to a base fixture and a second rubber sheet coupled to a first backing plate.

FIG. 4 is a conceptual diagram illustrating an example substrate comprising CMC component 18 and machinable stock layer 12 on one or more surfaces of CMC component 18. In the example of FIG. 4, CMC component 18 is positioned between rubber sheet 14*d* and rubber sheet 14*a*. Rubber sheets 14*d* and 14*a* are coupled to base fixture 10*d* and backing plate 10*a*, respectively. Backing plate 10*a* is movably coupled to base fixture 10*d* and configured to receive an applied compressive load and move relative to base fixture 10*d*. As described in the example of FIG. 1, backing plate 10*a* is configured to apply a first compressive load 11*a* (not shown in FIG. 4) along a y-axis. Rubber sheet 14*a* is configured to apply a first distributed compressive load 15*a* (not shown in FIG. 4) to CMC component 18 also along the y-axis in response to applied compressive load 11*a*. More specifically, in some examples, such as in the example of FIG. 4, rubber sheet 14*a* may be configured to translate applied compressive load 11*a* into distributed compressive load 15*a* that is substantially uniform and normal to a surface of CMC component 18. In some examples, such as in the example of FIG. 4, rubber sheet 14*a* and backing plate 10*a* may serve as a support component that works to prevent any fracture or other physical deformation of CMC component 18 due to loads applied by other rubber sheets and backing plates.

Upon tightening backing plate 10*a* to base fixture 10*d* via fasteners 22*a*, a controlled interference is imparted in rubber sheet 14*a* until the aluminum flange of backing plate 10*a* makes hard contact with base fixture 10*d*. Backing plate 10*a* and rubber sheet 14*a* are used to provide a load reaction such that the subsequent clamp features do not delaminate machinable stock layer 12.

Figure 5:
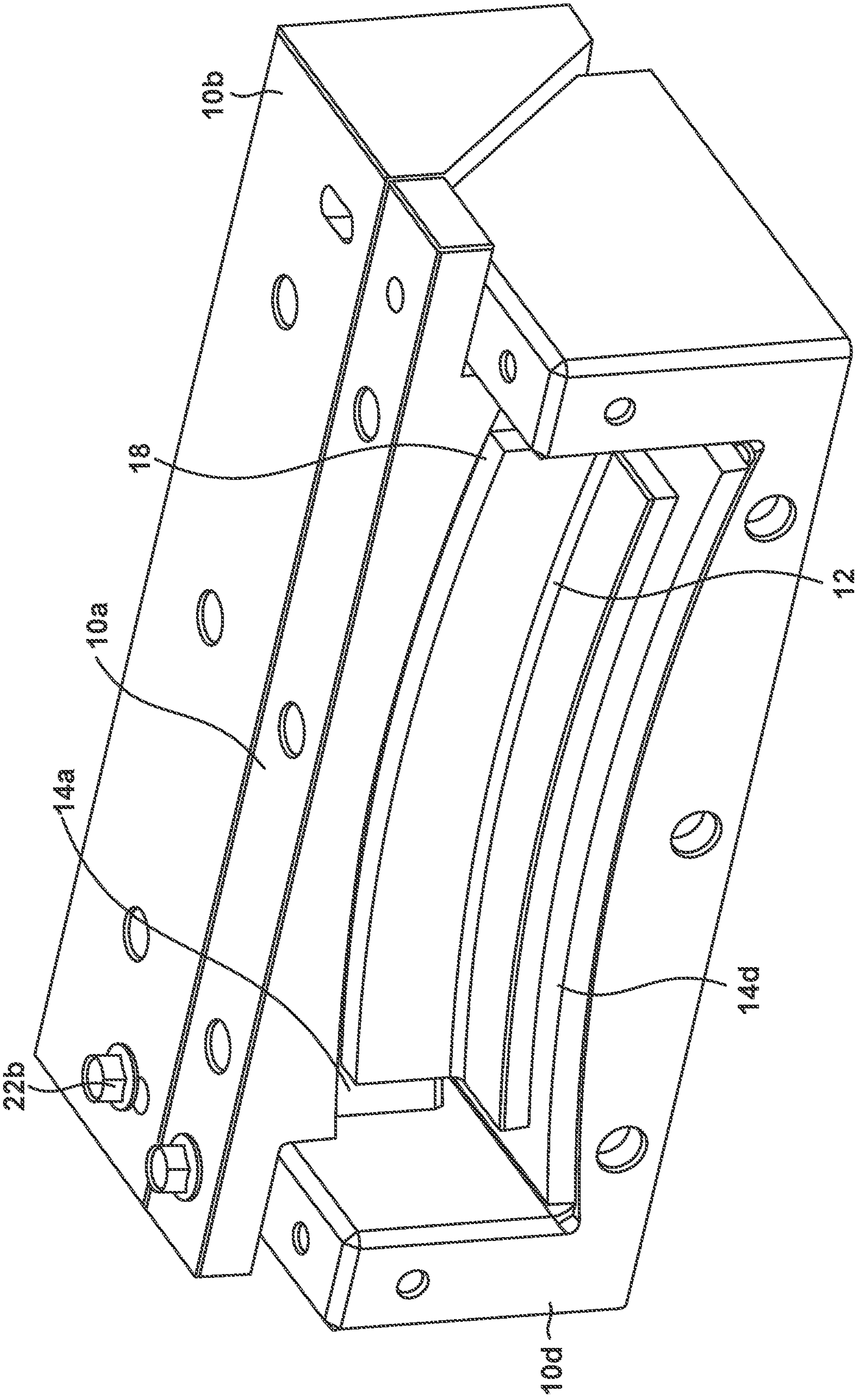
FIG. 5 is a conceptual diagram illustrating an example CMC component with an added machinable stock layer positioned between a first rubber sheet coupled to a base fixture, a second rubber sheet coupled to a first backing plate, and a third rubber sheet coupled to a second backing plate.

FIG. 5 is a conceptual diagram illustrating an example substrate comprising CMC component 18 and machinable stock layer 12 on one or more surfaces of CMC component 18. In the example of FIG. 5, CMC component 18 is positioned between rubber sheet 14*d*, rubber sheet 14*a*, and rubber sheet 14*b* (not shown in FIG. 5). Rubber sheets 14*d*, 14*a*, and 14*b* are coupled to base fixture 10*d*, backing plate 10*a*, and backing plate 10*b*, respectively. Backing plate 10*b* is movably coupled to base fixture 10*d* and configured to receive an applied compressive load and move relative to base fixture 10*d*. As described in the example of FIG. 1, backing plate 10*b* is configured to apply a second compressive load 11*b* (not shown in FIG. 5) along the y-axis and a third compressive load 11*c* (not shown in FIG. 5) along an x-axis. Rubber sheet 14*b* is configured to apply a second distributed compressive load 15*b* (not shown in FIG. 5) that is normal to surfaces of a first portion of machinable stock layer 12 in response to applied compressive loads 11*b* and 11*c*. More specifically, rubber sheet 14*b* may be configured to translate applied compressive loads 11*b* and 11*c* into distributed compressive load 15*b* that is substantially uniform and normal to surfaces of a first portion of machinable stock layer 12.

Upon tightening backing plate 10*b* to base fixture 10*d* via fasteners 22*b*, a controlled interference is imparted in rubber sheet 14*b* until the aluminum flange of backing plate 10*b* makes hard contact with base fixture 10*d*.

Figure 6:
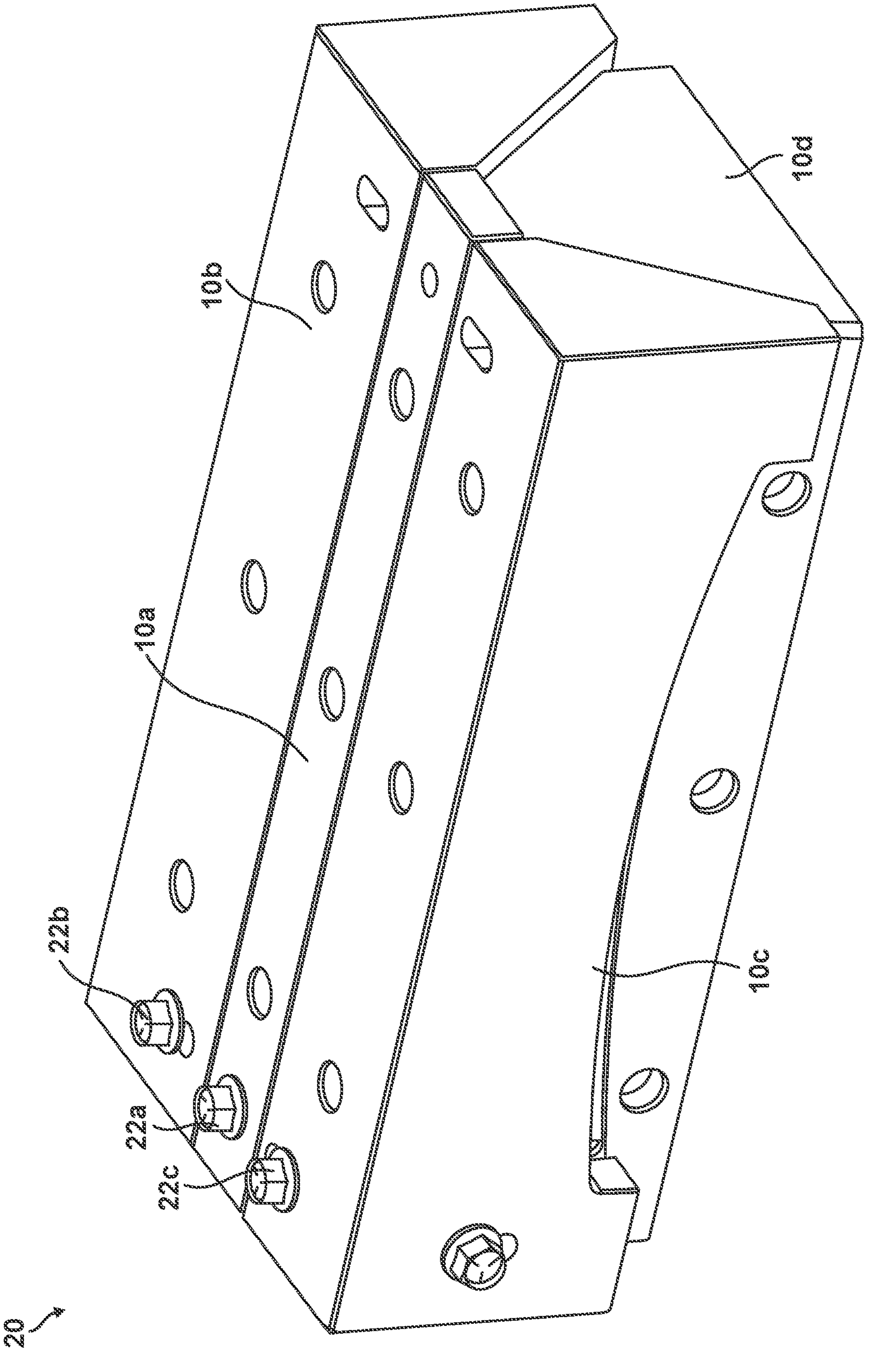
FIG. 6 is a conceptual diagram illustrating an example CMC component with an added machinable stock layer positioned between a first rubber sheet coupled to a base fixture, a second rubber sheet coupled to a first backing plate, a third rubber sheet coupled to a second backing plate, and a fourth rubber sheet coupled to a third backing plate.

FIG. 6 is a conceptual diagram illustrating an example system 20 including substrate comprising CMC component 18 and machinable stock layer 12 on one or more surfaces of CMC component 18. System 20 further includes CMC component 18 (not shown in FIG. 6) positioned between rubber sheets 14*d*, 14*a*, 14*b*, and 14*c* (not shown in FIG. 6). Rubber sheets 14*d*, 14*a*, 14*b*, and 14*c* are coupled to base fixture 10*d*, backing plate 10*a*, backing plate 10*b*, and backing plate 10*c*, respectively. Backing plate 10*c* is movably coupled to base fixture 10*d* and configured to receive an applied compressive load and move relative to base fixture 10*d*. As described in the example of FIG. 1, backing plate 10*c* is configured to apply a fourth compressive load 11*d* (not shown in FIG. 6) along the y-axis and a fifth compressive load 11*e* (not shown in FIG. 6) along the x-axis. Rubber sheet 14*c* is configured to apply a third distributed compressive load 15*c* (not shown in FIG. 6) that is normal to surfaces of a second portion of machinable stock layer 12 in response to applied compressive loads 11*d* and 11*e*. More specifically, rubber sheet 14*c* may be configured to translate applied compressive loads 11*d* and 11*e* into distributed compressive load 15*c* that is substantially uniform and normal to surfaces of a second portion of machinable stock layer 12.

Upon tightening backing plate 10*c* to base fixture 10*d* via fasteners 22*c*, a controlled interference is imparted in rubber sheet 14*c* until the aluminum flange of backing plate 10*c* makes hard contact with base fixture 10*d*.

System 20 may be substantially similar to system 8 of FIG. 1, wherein system 20 is designed to impart a controlled interference in rubber sheets 14*a*, 14*b*, 14*c*, and 14*d* when backing plates 10*a*, 10*b*, and 10*c* are tightened against base fixture 10*d* via fasteners, resulting in a controlled and uniform compression of machinable stock layer 12 onto the entire surface of CMC component 18. The controlled and uniform compression of machinable stock layer 12 by system 20 may further ensure a uniform machinable stock layer 12 thickness with no gaps between machinable stock layer 12 and CMC component 18.

In some examples, system 20 may include additional layers between the aluminum backing plates and machinable stock layer 12 to further maintain the positioning of machinable stock layer 12 on the surface of CMC component 18. For example, additional flexible compression layers comprising release film and/or breather cloth may be incorporated in system 20 before rubber sheets 14*a*, 14*b*, 14*c*, and 14*d* are positioned onto CMC component 18 and before any additional heat and pressure is applied to system 20. In some examples, an additional flexible compression layer may include a release film on rubber sheets 14*a*, 14*b*, 14*c*, and 14*d* or machinable stock layer 12, a breather cloth on the release film, and an elastomeric sheet on the breather cloth.

Once backing plates 10*a*, 10*b*, and 10*c* are tightened against base fixture 10*d* via fasteners 22*a*, 22*b*, and 22*c*, respectively, system 20 of FIG. 6 may be placed into a vacuum oven set at a predetermined temperature for a predetermined amount of time. For example, system 20 may undergo autoclaving for further heat and pressure application. In some examples, system 20 may receive further heat and pressure application in a vacuum, inert gas atmosphere, or other controlled environment. In some examples, system 20 may be heated at a temperature ranging from about 100° Celsius to about 150° Celsius. In some examples, the vacuum pressure applied to system 20 may range from about 12.28 psia to about 14.73 psia (about 25 in. Hg absolute to about 30 in. Hg absolute). In some examples, system 20 may receive further heat and pressure application for a time duration ranging from 30 minutes to 1 hour. Upon removal of system 20 from the vacuum oven, system 20 may cool before backing plates 10*a*, 10*b*, and 10*c* are removed.

Figure 7:
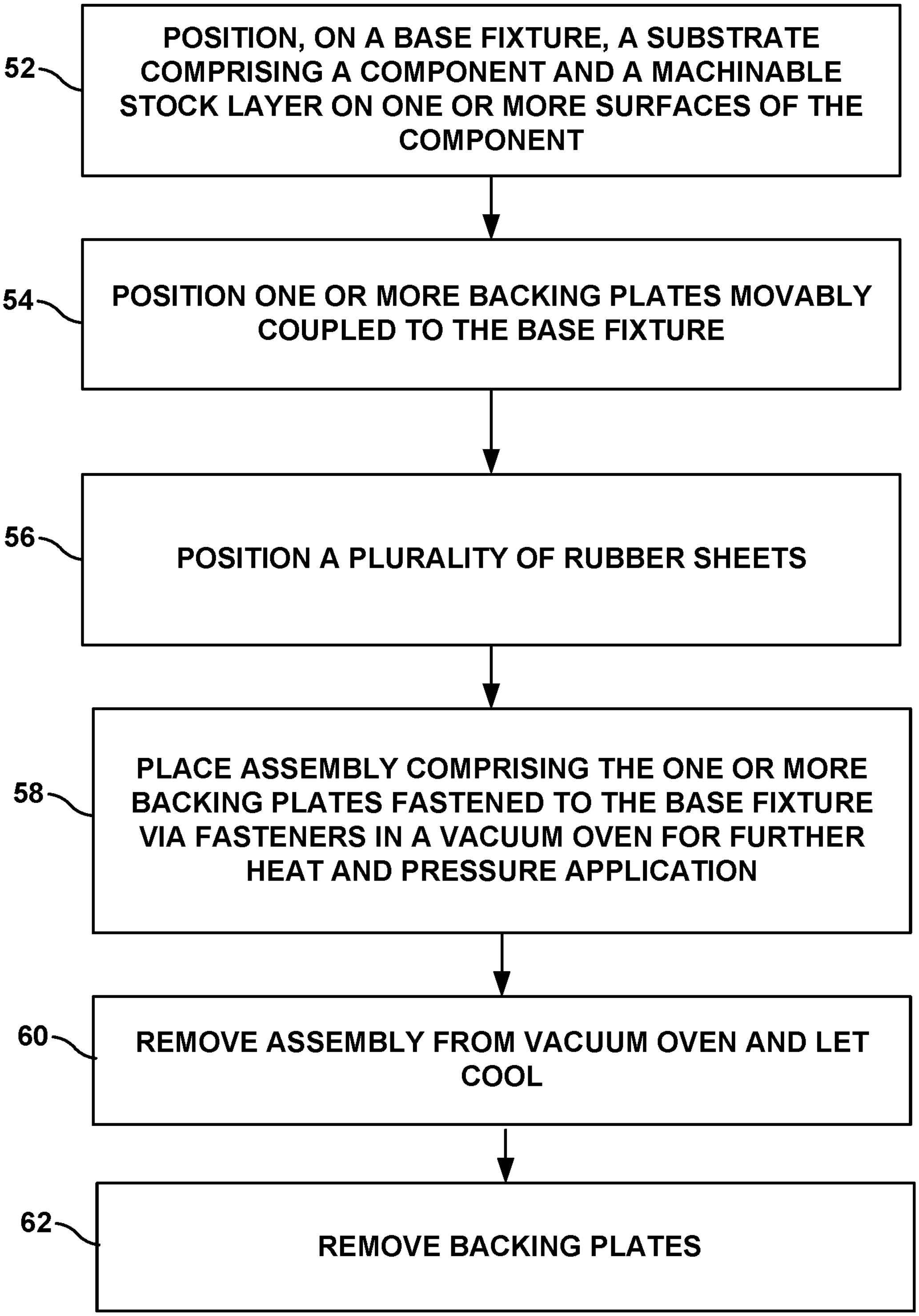
FIG. 7 is a flow diagram illustrating an example technique for additively applying machinable stock material onto a CMC component using multi-piece tooling.

FIG. 7 is a flow diagram illustrating an example technique for additively applying machinable stock material onto a CMC component using multi-piece tooling. The technique of FIG. 7 first includes positioning, on a base fixture, a substrate comprising a component and a machinable stock layer on one or more surfaces of the component (52). The machinable stock layer described in FIG. 7 may comprise one or more plies of a machinable stock material and may be substantially similar to machinable stock layer 12 of FIG. 3. The component described in FIG. 7 may be substantially similar to CMC component 18 of FIG. 3, and the base fixture may be substantially similar to base fixture 10*d* of FIG. 1. The technique of FIG. 7 further includes positioning one or more backing plates movably coupled to the base fixture (54). Each of the backing plates is configured to receive an applied compressive load and move relative to the base fixture. The one or more backing plates described in FIG. 7 may be substantially similar to backing plates 10*a*, 10*b*, and 10*c* of FIG. 1. The technique of FIG. 7 further includes positioning a plurality of rubber sheets (56). Each rubber sheet is coupled to one of the base fixture or a backing plate, and the plurality of rubber sheets is configured to translate the applied compressive load on the one or more backing plates into a distributed compressive load on a surface of the machinable stock layer. The plurality of rubber sheets described in FIG. 7 may be substantially similar to backing plates 14*a*, 14*b*, and 14*c* of FIG. 1. The technique of FIG. 7 further includes placing an assembly comprising the one or more backing plates fastened to the base fixture via fasteners in a vacuum oven for further heat and pressure application (58). The assembly described in FIG. 7 may be substantially similar to system 20 of FIG. 6 and the fasteners may be substantially similar to fasteners 22*a*, 22*b*, and 22*c* of FIGS. 4, 5, and 6, respectively. The technique of FIG. 7 further includes removing the assembly from the vacuum oven and allowing the assembly to cool (60). The technique of FIG. 7 further includes removing the backing plates (62).

Example 1: A method includes positioning, on a base fixture, a substrate comprising a component and a machinable stock layer on one or more surfaces of the component, wherein the machinable stock layer comprises one or more plies of a machinable stock material; positioning one or more backing plates movably coupled to the base fixture, wherein each of the backing plates is configured to receive an applied compressive load and move relative to the base fixture; and positioning a plurality of rubber sheets, wherein each rubber sheet is coupled to one of the base fixture or a backing plate, and wherein the plurality of rubber sheets is configured to translate the applied compressive load on the one or more backing plates into a distributed compressive load on a surface of the machinable stock layer.

Example 2: The method of example 1, wherein each backing plate is configured to move to a predetermined position to exert the applied compressive load, and wherein each rubber sheet is configured to deform according to a controlled interference when each backing plate is moved to the predetermined position.

Example 3: The method of any of examples 1 and 2, wherein a direction of the distributed compressive load is different from a direction of the applied compressive load.

Example 4: The method of any of examples 1 through 3, wherein the distributed compressive load is substantially uniform and normal to surface of the machinable stock layer.

Example 5: The method of any of examples 1 through 4, wherein the one or more backing plates are fastened to the base fixture with fasteners.

Example 6: The method of any of examples 1 through 5, wherein the component comprises a ceramic or ceramic matrix composite (CMC).

Example 7: The method of any of examples 1 through 6, wherein the machinable stock layer comprises a uniform thickness.

Example 8: The method of any of examples 1 through 7, wherein the plurality of rubber sheets comprises silicon.

Example 9: The method of any of examples 1 through 8, wherein the one or more backing plates comprise aluminum.

Example 10: An assembly includes a base fixture configured to position a substrate comprising a component and a machinable stock layer on one or more surfaces of the component, wherein the machinable stock layer comprises one or more plies of a machinable stock material; one or more backing plates movably coupled to the base fixture, wherein each of the backing plates is configured to receive an applied compressive load and move relative to the base fixture; and a plurality of rubber sheets, wherein each rubber sheet is coupled to one of the base fixture or a backing plate, and wherein the plurality of rubber sheets is configured to translate the applied compressive load on the one or more backing plates into a distributed compressive load on a surface of the machinable stock layer. 11. The assembly of claim 10, wherein each backing plate is configured to move to a predetermined position to exert the applied compressive load, and wherein each rubber sheet is configured to deform according to a controlled interference when each backing plate is moved to the predetermined position.

Example 12: The assembly of example 10, wherein a direction of the distributed compressive load is different from a direction of the applied compressive load.

Example 13: The assembly of any of examples 10 and 11, wherein the distributed compressive load is substantially uniform and normal to surface of the machinable stock layer.

Example 14: The assembly of any of examples 10 through 12, wherein the one or more backing plates are fastened to the base fixture with fasteners.

Example 15: The assembly of any of examples 10 through 13, wherein the component comprises a ceramic or ceramic matrix composite (CMC).

Example 16: The assembly of any of examples 10 through 14, wherein the machinable stock layer comprises a uniform thickness.

Example 17: The assembly of any of examples 10 through 15, wherein the plurality of rubber sheets comprises silicon.

Example 18: The assembly of any of examples 10 through 16, wherein the one or more backing plates comprise aluminum.

Example 19: The assembly of any of examples 10 through 17, wherein the assembly is placed into a vacuum oven after the backing plates are fastened to the base fixture.

Example 20: The assembly of any of examples 10 through 18, wherein, upon removal of the assembly from the vacuum oven, the assembly is cooled prior to removing the backing plates.

Various examples have been described. These and other examples are within the scope of the following claims.

What is claimed is:

1. An assembly, comprising:

a base fixture configured to position a substrate comprising a component and a machinable stock layer on one or more surfaces of the component, wherein the machinable stock layer comprises one or more plies of a machinable stock material;

one or more backing plates movably coupled to the base fixture, wherein each of the backing plates is configured to receive an applied compressive load and move relative to the base fixture; and a plurality of rubber sheets, wherein each rubber sheet is coupled to one of the base fixture or the one or more backing plates, and wherein the plurality of rubber sheets is configured to translate the applied compressive load on the one or more backing plates into a distributed compressive load on a surface of the machinable stock layer.

2. The assembly of claim 1, wherein each of the one or more backing plates is configured to move to a predetermined position to exert the applied compressive load, and wherein each of the plurality of rubber sheets is configured to deform according to a controlled interference when each of the one or more backing plates is moved to the predetermined position.

3. The assembly of claim 1, wherein a direction of the distributed compressive load is different from a direction of the applied compressive load.

4. The assembly of claim 1, wherein the distributed compressive load is substantially uniform and normal to the surface of the machinable stock layer.

5. The assembly of claim 1, wherein the one or more backing plates are fastened to the base fixture with fasteners.

6. The assembly of claim 1, wherein the component comprises a ceramic or ceramic matrix composite (CMC).

7. The assembly of claim 1, wherein the machinable stock layer comprises a uniform thickness.

8. The assembly of claim 1, wherein the plurality of rubber sheets comprises silicon.

9. The assembly of claim 1, wherein the one or more backing plates comprise aluminum.

10. The assembly of claim 1, wherein the assembly is placed into a vacuum oven after the one or more backing plates are fastened to the base fixture.

11. The assembly of claim 10, wherein, upon removal of the assembly from the vacuum oven, the assembly is cooled prior to removing the one or more backing plates.

* * * * *